(12) United States Patent
Schiffmiller (10) Patent No.: US 11,137,472 B2
(45) Date of Patent: Oct. 5, 2021

(54) AMPLITUDE BASED CENTROIDING FOR ANGLE OF ARRIVAL ESTIMATION

(71) Applicant: BAE Systems Information and Electronic Systems Integration Inc., Nashua, NH (US)

(72) Inventor: Richard Schiffmiller, Teaneck, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 391 days.

(21) Appl. No.: 16/256,679

(22) Filed: Jan. 24, 2019

(65) Prior Publication Data

US 2020/0241104 A1    Jul. 30, 2020

(51) Int. Cl.
*G01S 1/16* (2006.01)
*G01C 21/16* (2006.01)
*G01S 13/68* (2006.01)
*G01S 13/10* (2006.01)

(52) U.S. Cl.
CPC .............. *G01S 1/16* (2013.01); *G01C 21/165* (2013.01); *G01S 13/10* (2013.01); *G01S 13/68* (2013.01)

(58) Field of Classification Search
None
See application file for complete search history.

(56) References Cited

U.S. PATENT DOCUMENTS

| 6,289,280 B1 | 9/2001 | Fernandez-Corbaton et al. |
| 2006/0022866 A1 | 2/2006 | Walton et al. |
| 2008/0129546 A1 | 6/2008 | Manor |
| 2008/0204322 A1 | 8/2008 | Oswald et al. |
| 2016/0363660 A1 | 12/2016 | Gudim et al. |

OTHER PUBLICATIONS

International Search Report, PCT/US20/14577, dated Apr. 20, 2020, 15 pages.

*Primary Examiner* — Whitney Moore
(74) *Attorney, Agent, or Firm* — Finch & Maloney PLLC; Scott J. Asmus (57) ABSTRACT

Techniques are disclosed for determining AOA of one or more radar pulses received at a vehicle and originating from a source. The techniques are particularly well-suited to provide pilots with a more accurate determination of the azimuth angle to the radar source, although ground-based and water-based vehicles may benefit as well. Some embodiments discussed herein determine a true estimation of both azimuth and elevation angles, with reference to an aircraft's body-centered coordinate system, to the radar source. These parameters can also be used to determine a more accurate position on the ground for the radar source.

17 Claims, 8 Drawing Sheets

AMPLITUDE BASED CENTROIDING FOR ANGLE OF ARRIVAL ESTIMATION

BACKGROUND

Aircraft and other vehicles use angle of arrival (AOA) estimation techniques to determine an azimuth angle in the general direction of the origin of received radar pulses. In this way, for example, an aircraft can attempt to avoid enemy radar systems by steering away from their locations. The AOA of one or more radar pulses is typically determined using amplitude measurements of the received radar pulses from an array of antennas spaced apart from one another. However, there are a number of issues with this amplitude-based measurement that lead to inaccurate estimates of the AOA, and that make it difficult to determine the true azimuth angle to the source of the radar pulses.

BRIEF DESCRIPTION OF THE DRAWINGS

Features and advantages of embodiments of the claimed subject matter will become apparent as the following Detailed Description proceeds, and upon reference to the Drawings, in which:

Although the following Detailed Description will proceed with reference being made to illustrative embodiments, many alternatives, modifications, and variations thereof will be apparent in light of this disclosure.

DETAILED DESCRIPTION

Techniques are disclosed for estimating angle of arrival (AOA) of one or more radar pulses. In one example, the techniques are particularly well-suited to provide pilots with a more accurate determination of the azimuth angle to the radar source. Further examples relate to autonomous vehicles and projectiles that use the AOA estimation. Current AOA determination systems that rely solely on amplitude-based measurements from a plurality of antennas to estimate the AOA do not provide a true azimuth angle to the source location, but rather a "cone" of possible locations around an axis connecting the plurality of antennas. Example embodiments discussed herein determine a true estimation of both azimuth and elevation angles, with reference to the aircraft's body-centered coordinate system, to the radar source. These parameters can also be used to determine a more accurate position on the ground for the radar source.

One example embodiment includes a method of determining an AOA of electromagnetic pulses received at an aircraft and originating from a source. The method includes determining a position and orientation of the vehicle within a given dwell time, and determining an average initial AOA measurement and an average range from the vehicle to the source. The averages are determined based on a plurality of electromagnetic pulses received within the given dwell time. The method also includes converting the position of the aircraft into an ECEF Cartesian coordinate system and determining an elevation angle between the aircraft and the source based on the position of the aircraft and the average range. The method includes converting the elevation angle from a local level coordinate system into a local body coordinate system centered at the aircraft and determining a position of the source in the ECEF Cartesian coordinate system based on the average initial AOA measurement, the converted elevation angle, and the converted position of the aircraft. This process may be repeated for each dwell, and the determined position from each dwell can be averaged together. The method includes converting the determined position of the source into the local body coordinate system centered at the aircraft and generating a vector from the aircraft to the source in the local body coordinate system. The true azimuth AOA measurement can then be determined based on the vector. Numerous variations and embodiments will be apparent in light of this disclosure.

General Overview

Figure 1:
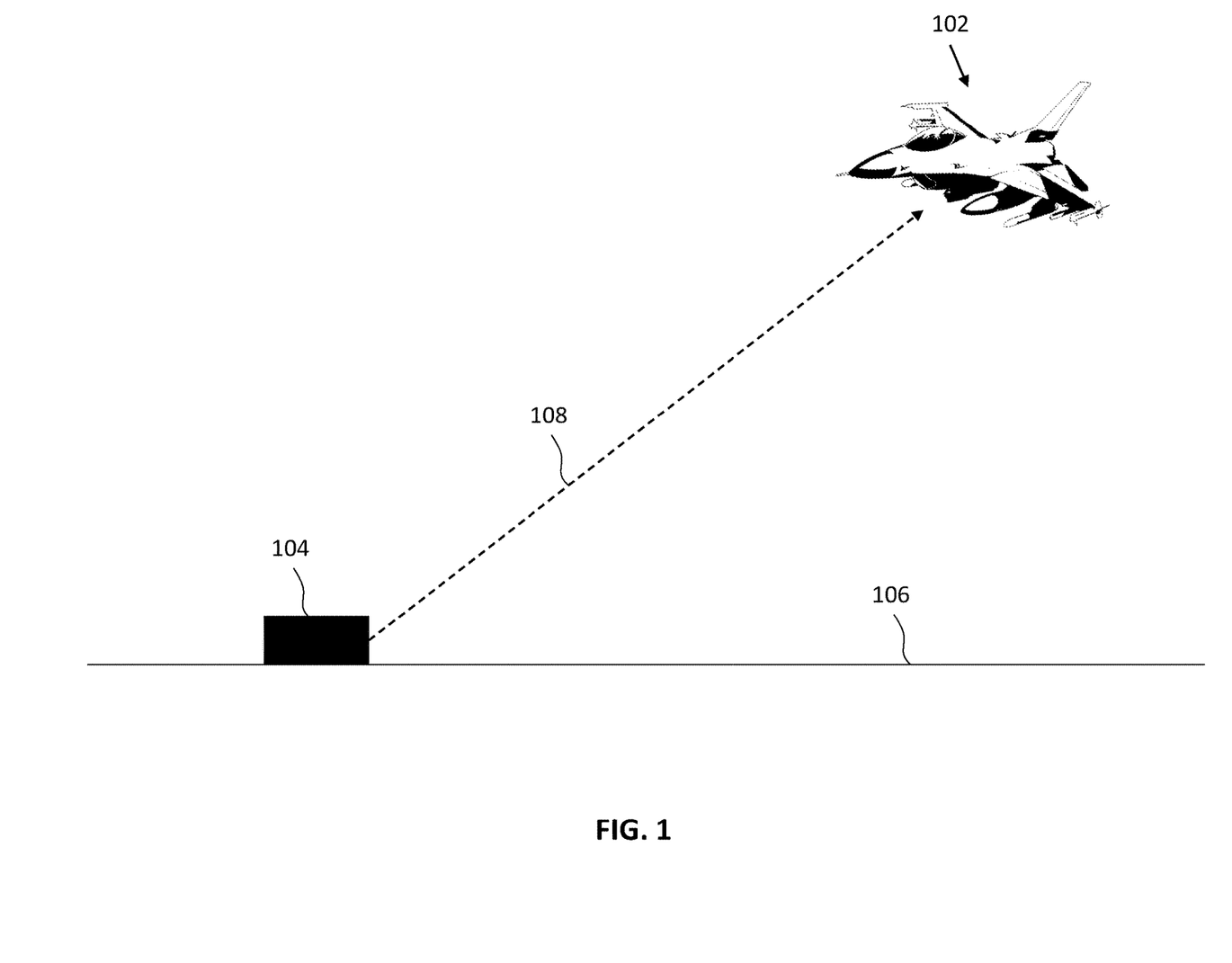
FIG. 1 illustrates an aircraft receiving pulses from a ground-based radar system, in accordance with some embodiments of the present disclosure.

FIG. 1 illustrates an example scenario including an aircraft 102 and a radar source 104 present on the ground 106. Radar source 104 transmits an electromagnetic pulse 108 that is received by aircraft 102. In some examples, radar source 104 transmits a plurality of electromagnetic pulses at a same frequency, or over a particular frequency range. Radar source 104 may be stationary, such as at a building or base facility, in some such scenarios. In some other example scenarios, radar source 104 may be located on a land-based vehicle, or a sea-based vehicle. Electromagnetic pulse 108 may have a frequency between about, for example, 30 MHz and about 1000 MHz, or between about 1 GHz and 15 GHz, although other frequency ranges may be used.

Aircraft 102 includes an array of antennas designed to receive electromagnetic pulse 108. The antennas may be placed at different locations around aircraft 102 and may face different directions. By using multiple antennas, a crude AOA estimation can be made by comparing the power received at the different antennas from electromagnetic pulse 108. For example, if an antenna placed at the left wing of the aircraft and directed to the left side of the aircraft receives a higher power of electromagnetic pulse 108 compared to an antenna placed at the right wing of the aircraft and directed to the right side of the aircraft, then the amplitude-based system estimates that the source of electromagnetic pulse 108 is from the left side of the aircraft. By comparing the power received at the antennas orientated in different directions on aircraft 102 with a predetermined calibration table of angle versus amplitude difference across the antennas, the AOA of the source can be estimated. However, this technique suffers from inaccuracies. For example, the effect of elevation angle on the azimuthal antenna pattern is typically unknown and ignored. In addition, two antennas measuring the same signal will typically not measure the same amplitude, leading to what is called a tracking error. Also, the estimated AOA cannot provide a true azimuth angle from aircraft 102 to radar source 104, and instead determines a cone angle which provides numerous possible locations on ground 106 for radar source 104. Accordingly, an example embodiment discussed herein uses the initial AOA measurements determined by the antenna array around the aircraft and also the orientation and position of the aircraft to calculate an estimated position on the ground for emitter 104, and then averages those positions over time to determine a more accurate true azimuth angle (AOA) to emitter 104.

The scenario presented in FIG. 1 is just one example, and other scenarios involving AOA calculation may be contemplated. For example, aircraft 102 and/or radar source 104 may also be a land or ship-based vehicle. Accordingly, ground 106 can also represent the surface of a body of water such as a river, lake, or ocean. In one example, aircraft 102 is a drone, projectile, or precision guided munition.

Figure 2:
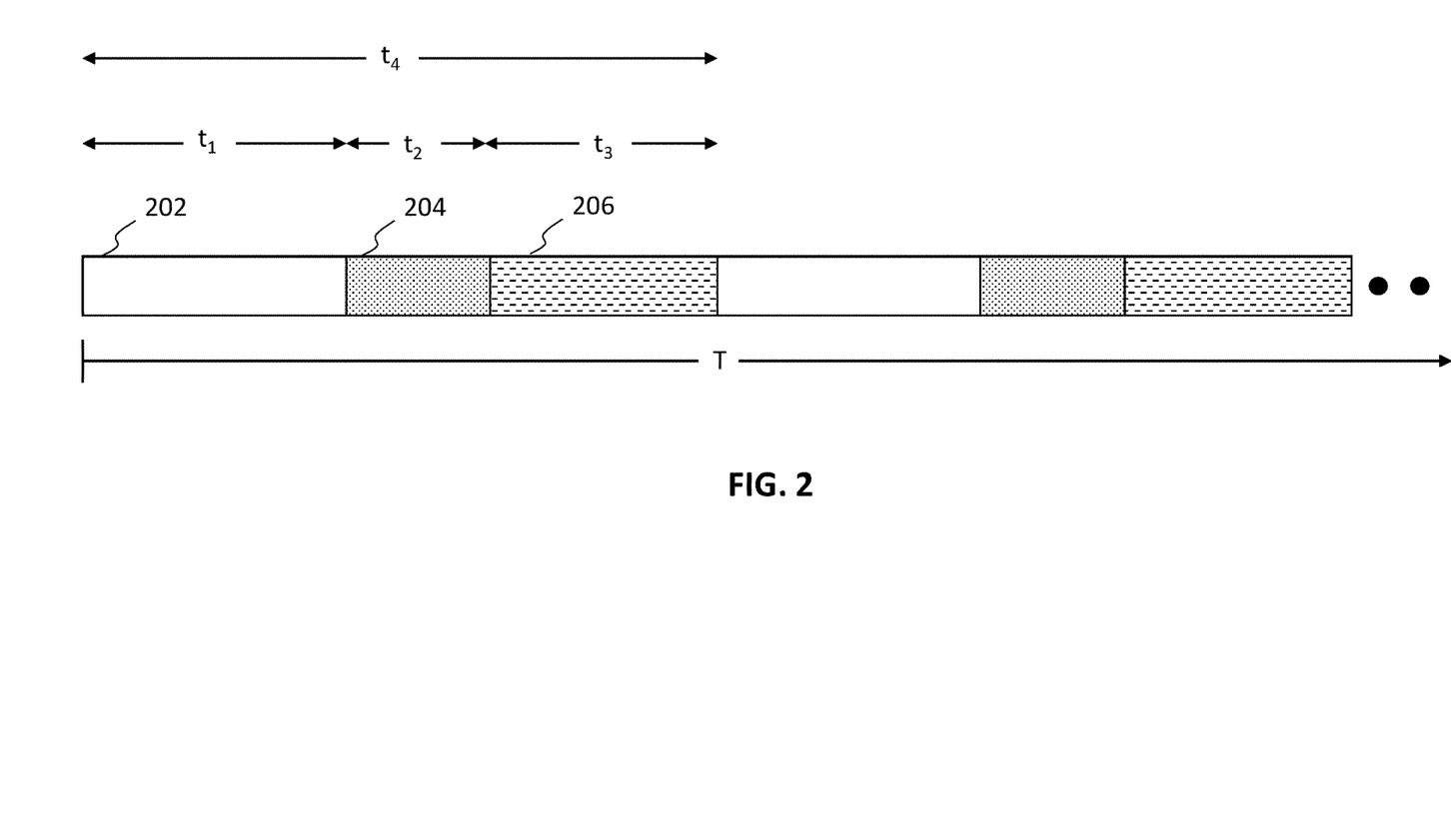
FIG. 2 illustrates a frequency sweep performed by the aircraft to listen for radar pulses, in accordance with an embodiment of the present disclosure.

FIG. 2 provides an illustrative example of a frequency sweep that may be performed by a system on board aircraft 102, according to an embodiment. Not all radar systems operate at the same frequency. Thus, aircraft 102 sweeps through multiple frequencies in an attempt to "listen" at the correct frequency and receive enough power from electromagnetic pulse 108. FIG. 2 illustrates changing the tuned frequency of the antenna array over time (T). For example, the frequency is tuned to a first frequency 202 over a first time period $t_1$, then to a second frequency 204 over a second time period $t_2$, and finally a third frequency 206 over a third time period $t_3$. The system may repeat this pattern, continually tuning between frequencies 202, 204, and 206 following a given time period $t_4$. It will be appreciated that frequencies 202, 204, and 206 can each also represent different or overlapping ranges of frequencies.

Each of the times, $t_1$, $t_2$, and $t_3$ that the system remains listening at a particular frequency (or frequency range) is known as a dwell time. In some embodiments, the dwell times for each different frequency or frequency range is the same. In other embodiments, the dwell times for each different frequency or frequency range are different from one another. A typical dwell time may last between about 20 ms and 50 ms, although other time durations may be used as well.

Although a sweep of only three different frequencies (or frequency ranges) is illustrated, this is for illustrative purposes only and any number of different frequencies can be included in the frequency sweep, each having either a same dwell time or different dwell times. In a given dwell time, multiple electromagnetic pulses may be received from a single radar source.

Coordinate System Considerations

As will be appreciated in light of this disclosure, an improved methodology is provided for determining AOA of received electromagnetic pulses. The method includes converting various parameters between different coordinate systems to achieve a more accurate result. Accordingly, a brief discussion of the three coordinate systems referred to herein is provided here.

Figure 3:
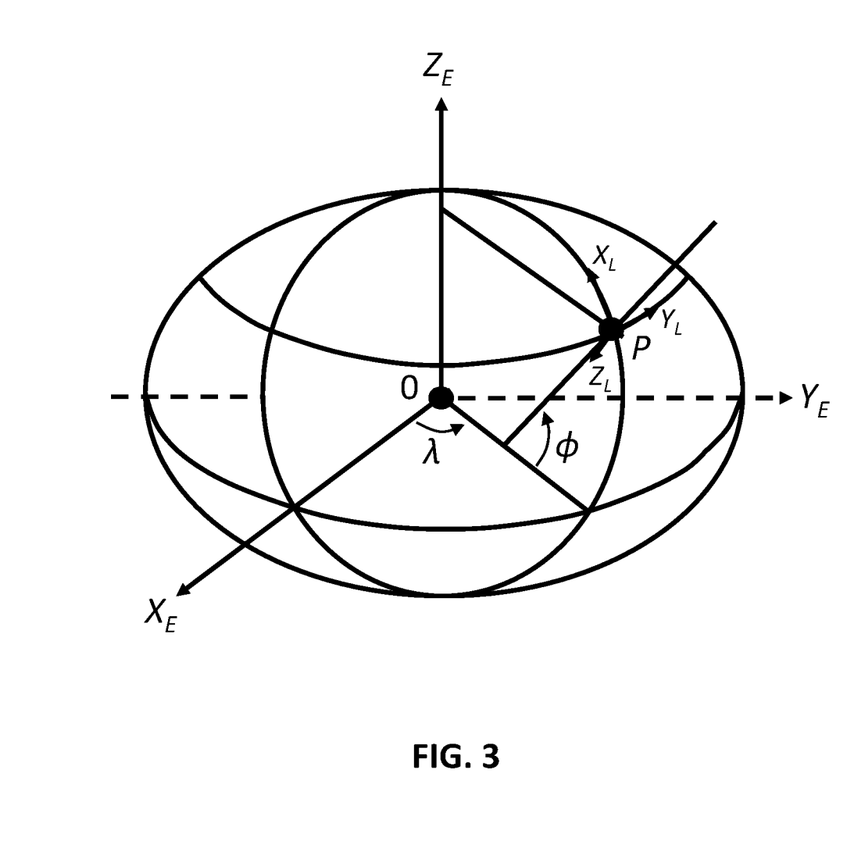
FIG. 3 illustrates examples of an earth centered earth fixed (ECEF) coordinate frame and a local level (inertial) coordinate frame, in accordance with some embodiments of the present disclosure.

FIG. 3 illustrates an example of an earth-centered, earth-fixed (ECEF) coordinate system and a local level coordinate system centered at a point P. The ECEF coordinate system is a Cartesian system having its origin at the center of the earth (0), and having perpendicular axes $X_E$, $Y_E$, and $Z_E$. Axes $X_E$ and $Y_E$ are perpendicular to each other in the equatorial plane of earth, and $Z_E$ is along the mean rotational axis of earth. Positive axis $X_E$ is defined as being through the prime meridian (i.e., 0 degrees longitude). From this coordinate system, longitude to a point P is defined as the angle (λ) of the plane containing the $Z_E$ axis and the point P from the plane containing the $Z_E$ and $X_E$ axes. Latitude is defined as the angle (ϕ) created by the equatorial plane and the normal to the reference ellipsoid through the point P. Notice that latitude is defined based on an ellipsoid rather than a sphere as the actual earth shape is not a perfect sphere.

A local level coordinate system (sometimes also referred to as an 'NED' (North/East/Down) coordinate system) is illustrated at point P in FIG. 3. The NED coordinate system is another Cartesian system having its origin at some point P on the reference earth ellipsoid. The NED coordinate system has axes $X_L$, $Y_L$, and $Z_L$, with $X_L$ pointing north, $Y_L$ pointing east, and $Z_L$ pointing straight down into the earth. It should be noted that $Z_L$ does not point directly towards the center of the earth due to the ellipsoidal shape of the earth.

Figure 4:
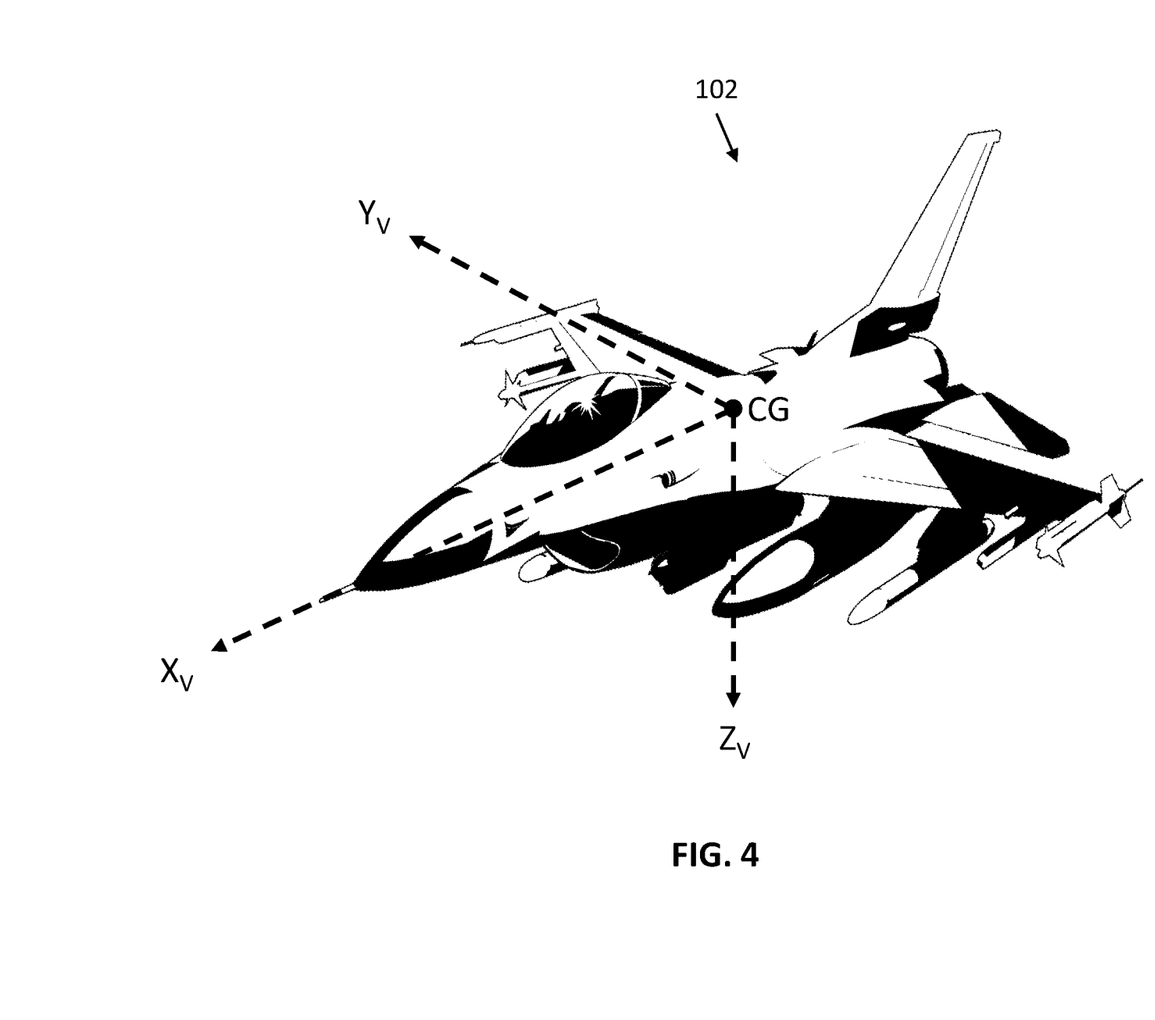
FIG. 4 illustrates an example of a vehicle body coordinate frame, in accordance with an embodiment of the present disclosure.

FIG. 4 illustrates an example of a local body coordinate system. In the illustrated example, the local body coordinate system is defined for aircraft 102 having its origin at the center of gravity CG of aircraft 102. The local body coordinate system is another Cartesian system having axes $X_V$, $Y_V$, and $Z_V$. Axis $X_V$ is toward the front nose of the aircraft (i.e., along the roll axis of the aircraft). Axis $Y_V$ is toward the right wing of the aircraft and perpendicular to the $X_V$ axis (i.e., along the pitch axis of the aircraft). Axis $Z_V$ points directly below the aircraft and is perpendicular to both $X_V$ and $Y_V$ axes (e.g., along the yaw axis of the aircraft).

Figure 5:
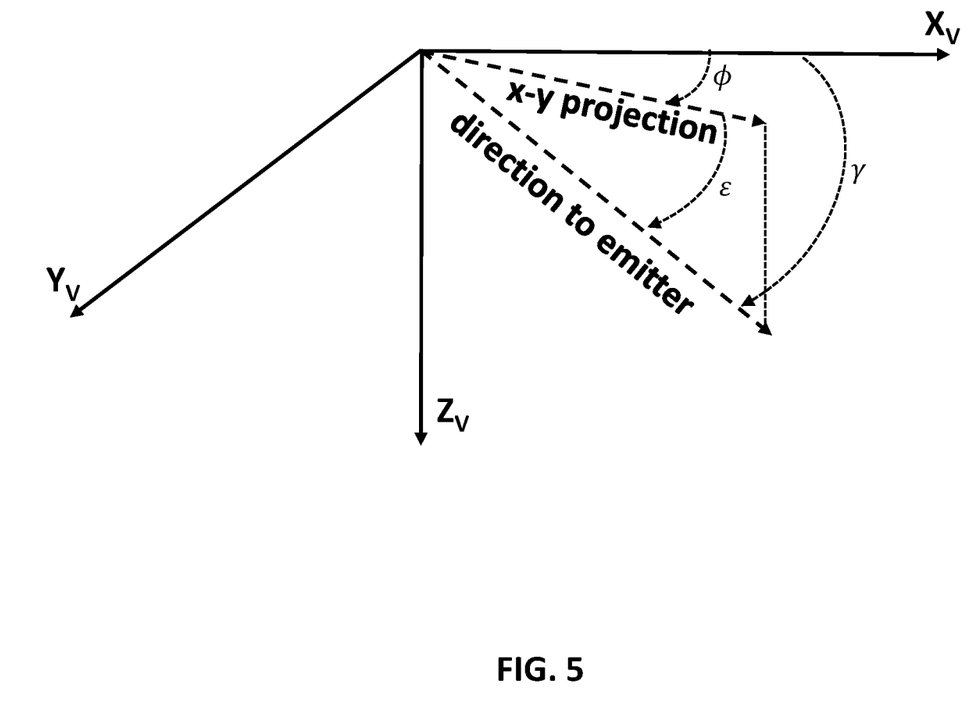
FIG. 5 illustrates various angles that can be determined in the vehicle body coordinate frame, in accordance with some embodiments of the present disclosure.

FIG. 5 illustrates an example of determining various angles between a vehicle and a source emitter of radar signals using the local body coordinate system. Given a direction vector towards the emitter, an azimuth angle (ϕ) to the emitter is defined as the angle between the x-y projection vector in the $X_V$-$Y_V$ plane and the $X_V$ axis, and an elevation angle (ε) is defined as the angle between the x-y projection vector in the $X_V$-$Y_V$ plane and the direction vector towards the emitter. A cone angle can also be defined as the angle (γ) between the direction vector towards the emitter and the $X_V$ axis. In this example, the $X_V$ axis is the axis of the cone. The angles are geometrically related to one another using the expression:

$$\cos(\gamma) = \cos(\phi) * \cos(\varepsilon) \qquad (1)$$

According to some embodiments, an improved technique for determining the AOA of radar signals from a source emitter involves a calculation of the direction vector to the source emitter. From the direction vector, an estimated location of the source emitter on the ground may be computed. If this procedure is repeated for multiple dwells of data over time, the set of estimated locations on the ground may be averaged to find a centroid location. The direction vector to the centroid location of the source emitter on the ground may be calculated. Once the direction vector has been calculated, the azimuth angle (ϕ) and the elevation angle (ε) to the centroid location can be determined in the local body coordinate system.

System and Method for AOA Determination

Figure 6:
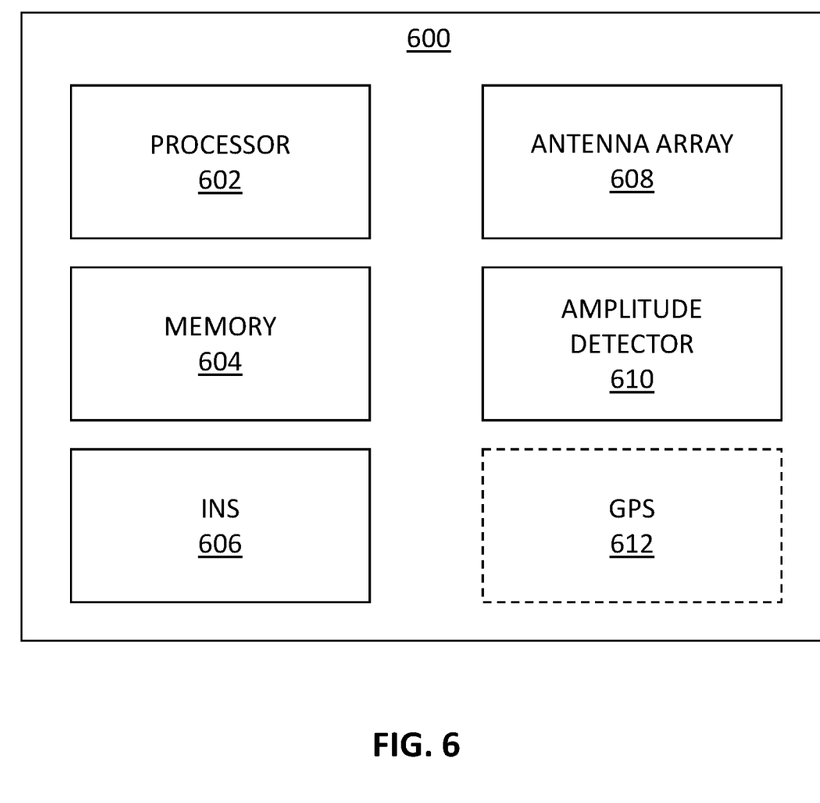
FIG. 6 illustrates a system for determining AOA, in accordance with an embodiment of the present disclosure.

FIG. 6 illustrates an AOA determination system 600 for use on board a vehicle, such as an aircraft, according to an embodiment. Other vehicles that may have AOA determination system 600 include ships, submarines, guided munitions, rotary aircraft, drones, or spacecraft. According to some embodiments, system 600 includes a processor 602, memory 604, an inertial navigation system (INS) 606, an antenna array 608, and an amplitude detector 610. System 600 may optionally include a global positioning system (GPS) 612. In some embodiments, the operations performed by amplitude detector 610 are performed by processor 602 instead. Additionally, in various embodiments, system 600 may not include one or more of the components illustrated in FIG. 6, but system 600 may include interface circuitry for coupling to the one or more components. For example, system 600 may not include antenna array 608, but may include interface circuitry (e.g., a connector and driver circuitry) to which antenna array 608 may be coupled.

Processor 602 may be designed to control the operations of the various other components of system 600. Processor 602 can represent one or more processors. As used herein, the term "processor" may refer to any device or portion of a device that processes electronic data from registers and/or memory to transform that electronic data into other electronic data that may be stored in registers and/or memory. Processor 602 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices. System 600 may include memory 604, which may itself include one or more memory devices such as volatile memory (e.g., dynamic random access memory (DRAM)), nonvolatile memory (e.g., read-only memory (ROM)), flash memory, solid state memory, and/or a hard drive. In some embodiments, memory 604 is integrated on a same die with processor 602.

According to some embodiments, processor 602 receives one or more inputs from other components of system 600 and uses those inputs to determine various parameters that can be used to define a source location of received electromagnetic pulses. As discussed in more detail in FIG. 7, processor 602 may receive initial amplitude measurements collected from antenna array 608 and amplitude detector 610 from which it computes AOA and estimated range to the source emitter position, and position and orientation measurements of the vehicle collected from INS 606 (and possibly also from GPS 612).

INS 606 may represent any one of a number of known inertial navigation systems used on various types of vehicles. Accordingly, INS 606 may use any number of accelerometers and/or gyroscopes to continuously monitor one or more of position, orientation, and velocity of the vehicle. In some embodiments, INS 606 is calibrated to report position, orientation, and velocity with reference to the center of gravity of the vehicle.

Antenna array 608 may represent any number of antennas located around the vehicle, according to an embodiment. For example, four antennas may be used with each orientated to provide maximum coupling efficiency for signals received from four different directions (e.g., north, south, east, and west). Each of the antennas of antenna array 608 may be designed to provide high coupling efficiency for radar frequencies between about 30 MHz and about 1000 MHz, or between about 1 GHz and 15 GHz. In some embodiments, the antennas of antenna array 608 are rotating antennas to ensure a wide listening range around the vehicle.

Amplitude detector 610 may represent one or more circuits or circuit elements designed to measure amplitudes of a received electromagnetic pulse from the antennas of antenna array 608. In some embodiments, amplitude detector 610 includes an envelope detector having one or more operational amplifiers or diodes. Amplitude detector 610 may represent digital detectors that determine the amplitudes of the received electromagnetic pulse after passing through an analog-to-digital converter.

GPS 612 may be included in system 600 to provide a more accurate global position of the vehicle. Accordingly, in some embodiments, GPS 612 can work in concert with INS 606 to provide more accurate position data to processor 602.

Figure 7:
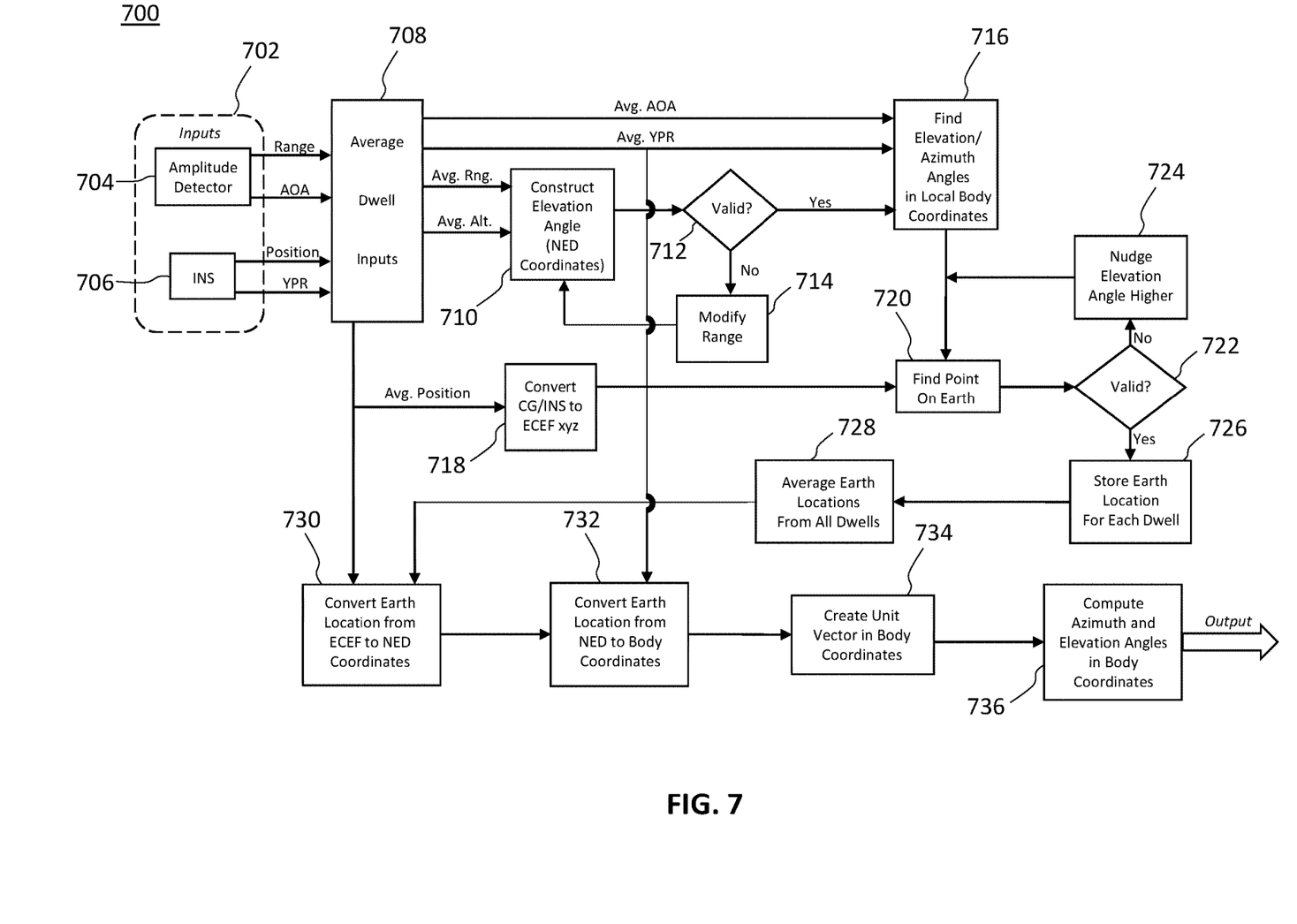
FIG. 7 illustrates a flowchart of a method for determining AOA, in accordance with an embodiment of the present disclosure.

FIG. 7 is a flowchart illustrating an example method 700 for determining an AOA of one or more received electromagnetic pulses (e.g., emitted from radar) at a vehicle, in accordance with certain embodiments of the present disclosure. As can be seen, the example method includes a number of processes and sub-processes, the sequence of which may vary from one embodiment to another. However, when considered in the aggregate, these processes and sub-processes form a process for determining AOA in accordance with certain of the embodiments disclosed herein. These embodiments can be implemented, for example using AOA determination system 600 illustrated in FIG. 6 as described above. However other system architectures can be used in other embodiments, as will be apparent in light of this disclosure. To this end, the correlation of the various functions shown in FIG. 7 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module having decoupled sub-modules can be used to perform all of the functions of method 700. Thus, other embodiments may have fewer or more modules and/or sub-modules depending on the granularity of implementation. In still other embodiments, the methodology depicted can be implemented as a computer program product including one or more non-transitory machine readable mediums that when executed by one or more processors cause the methodology to be carried out. Numerous variations and alternative configurations will be apparent in light of this disclosure.

Method 700 describes a process in which numerous inputs 702 are received from one or more sources, according to an embodiment. For example, an amplitude detector 704 may be used to provide an initial AOA measurement as discussed above along with an estimated range to the source of the transmitted electromagnetic pulses, based at least on incoming electromagnetic pulses received by an antenna array. The range can be estimated using any known ranging method. In one example, the range is estimated using a lookup table stored in memory that includes known transmission power and frequency for a range of different types of radar systems. By using the frequency and/or other characteristic features of the received one or more electromagnetic pulses, the lookup table can be used to find the appropriate radar system that sent the one or more electromagnetic pulses. The initial transmission power of the selected radar system can then be compared to the received power of the electromagnetic pulses to estimate the distance that the one or more electromagnetic pulses traveled (i.e., the range to the source).

Another example of inputs received includes receiving vehicle position data and data associated with the orientation of the vehicle ('YPR' which stands for 'yaw', 'pitch', and 'roll'). Such data can be received from an INS 706, and optionally also from GPS. The INS may provide latitude, longitude, and altitude of the vehicle as part of the position data.

At block 708, some of the received inputs (e.g., range and AOA measurements) are averaged over multiple received electromagnetic pulses in a given dwell time. For example, range values are determined for each received electromagnetic pulse in the given dwell time, and the values are averaged together to determine an average range value for the given dwell time. Similarly, AOA measurements are determined for each received electromagnetic pulse in the given dwell time, and the values are averaged together to determine an average AOA value for the given dwell time. Other received inputs (e.g., position and YPR) may be averaged over multiple reports received from the INS in a given dwell time. As discussed previously with reference to FIG. 2, a dwell is defined as the amount of time that the system on board the vehicle "listens" to a particular frequency or frequency range. For however long the system listens at a particular frequency or frequency range, a plurality of radar pulses can be received. For example, anywhere between 5 and 50 pulses can be received in a given dwell time. The averaging operation generates an average AOA measurement, an average orientation (YPR) and an average range. Additionally, according to an embodiment, an average latitude, longitude and altitude (position) can be determined from the INS data.

The inputs received from the INS (e.g., position and YPR) may not update as quickly as the electromagnetic pulses are received in a given dwell time. In some embodiments, the INS only updates position and YPR data every 50 ms. If INS data inputs are received only once during a given dwell time, then no averaging may be necessary of the INS inputs. In another example, if no INS data inputs are received during a given dwell time, then a most recent data report from INS 706 including the position and YPR data may be used.

At block 710, an elevation angle is determined in the NED coordinate system based on the received average range and average altitude from block 708. According to an embodiment, the elevation angle is determined in the NED coordinate system.

At block 712, a determination is made regarding whether the elevation angle calculated in block 710 is a valid angle. For example, if the elevation angle is not valid (e.g., the calculated elevation angle is an imaginary number) then method 700 proceeds to block 714 where the average range value is modified and then block 710 is executed again with the new range value to calculate a new elevation angle. An imaginary elevation angle would be calculated if the average range is smaller than the altitude (which is impossible because the hypotenuse of a right triangle cannot be shorter than either of the other two sides.) According to an embodiment, the range may be multiplied by a given factor in block 714, such as, for example, a factor of 1.1. In another embodiment, the range may be incremented by a given distance.

If the elevation angle is determined to be a valid result, method 700 continues to block 716 where elevation and azimuth angles are both determined in the local body coordinate system. According to an embodiment, received as inputs at block 716 are the elevation angle in the NED coordinate system, the average AOA measurement in local body coordinates, and the average orientation (YPR) of the vehicle. From the average AOA measurement, an azimuth angle in the local body coordinate system can be determined. In some embodiments, the azimuth angle in the local body coordinate system is substantially similar to the averaged initial AOA measurements for a given dwell time.

Converting the elevation angle to the local body coordinate system from the NED coordinate system may involve generating a matrix of direction cosines that relate the NED and local body coordinate systems. From that matrix, equations may be generated and solved for the elevation angle in local body coordinates. For example, let B be a matrix for the NED-to-body coordinate system transformation, parameters x, y, and z are unit vectors in the NED coordinate system, and parameters x', y', and z' are unit vectors in the local body coordinate system such that:

$$x = \cos(\phi)\cos(\varepsilon) \quad (2)$$
$$y = \sin(\phi)\cos(\varepsilon)$$
$$z = \sin(\varepsilon)$$
$$x' = \cos(\phi')\cos(\varepsilon')$$
$$y' = \sin(\phi')\cos(\varepsilon')$$
$$z' = \sin(\varepsilon')$$

$$\begin{bmatrix} x' \\ y' \\ z' \end{bmatrix} = \begin{pmatrix} b_{11} & b_{12} & b_{13} \\ b_{21} & b_{22} & b_{23} \\ b_{31} & b_{32} & b_{33} \end{pmatrix} \begin{bmatrix} x \\ y \\ z \end{bmatrix} \quad (3)$$

Where $\phi$ is the measured azimuth angle in the NED coordinate system, $\varepsilon$ is the elevation angle in the NED coordinate system, $\phi'$ is the measured azimuth angle in the local body coordinate system, $\varepsilon'$ is the elevation angle in the local body coordinate system, and $b_{11}$ through $b_{33}$ are array parameters of the matrix B. Matrix B can be provided as:

$$B = \begin{pmatrix} \cos(p)\cos(h) & \cos(p)\sin(h) & -\sin(p) \\ -\cos(r)\sin(h) + \sin(r)\sin(p)\cos(h) & \cos(r)\cos(h) + \sin(r)\sin(p)\sin(h) & \sin(r)\cos(p) \\ \sin(r)\sin(h) + \cos(r)\sin(p)\cos(h) & -\sin(r)\cos(h) + \cos(r)\sin(p)\sin(h) & \cos(r)\cos(p) \end{pmatrix} \quad (4)$$

Where p is the measured pitch angle of the vehicle, h is the measured yaw angle of the vehicle, and r is the measured roll angle of the vehicle. By rearranging terms from equation (3), it can be determined that:

$$\frac{y'}{x'} = \frac{b_{21}x + b_{22}y + b_{23}z}{b_{11}x + b_{12}y + b_{13}z} = \tan(\phi') \quad (5)$$

Rearranging terms from equation (5) can then yield:

$$(b_{11}t - b_{21})x + (b_{12}t - b_{22})y = (b_{23} - b_{13}t)z \quad (6)$$

Where t=tan($\phi'$). Substituting the definitions of x, y, and z from Equation (2), and dividing through by the cosine of the assumed elevation angle, yields:

$$(b_{11}t - b_{21})\cos(\phi) + (b_{12}t - b_{22})\sin(\phi) = (b_{23} - b_{13}t)\tan(\phi') \quad (7)$$

Equation (7) can be rewritten as:

$$\sin(\phi + \psi) = (b_{23} - b_{13}t)\tan(\varepsilon)/M \quad (8)$$

Where $M = (cx^2 + cy^2)^{1/2}$, $\psi$=a tan 2(cy,cx), cx=($b_{12}t - b_{22}$), and cy=($b_{11}t - b_{21}$). There are two solutions in equation (8) for the azimuth angle $\theta$ in the NED coordinate system, as shown below:

$$\phi = \alpha - \psi \text{ and } \phi = \pi - \alpha - \psi \quad (9)$$

Where $\alpha = \sin^{-1}((b_{23} - b_{13}t)\tan(\varepsilon)/M)$. Each possible solution may be substituted back into Equation (3) to see which yields the better result. According to an embodiment, the solution having the better result is the solution yielding an azimuth angle in local body coordinates that is closest to the measured azimuth angle in local body coordinates. Once the value for ϕ is chosen from between the two choices, the values of x, y, and z may be computed, since the elevation angle E is already known.

Multiplying matrix B by the NED coordinate vector [x;y;z] yields the local body coordinate vector [x';y';z'] as per Equation 3. The elevation angle in local body coordinates (E') can then be determined from:

$$\varepsilon' = a\tan 2(z', \sqrt{x'^2 + y'^2}) \quad (10)$$

At block 718, the average position of the vehicle determined at block 708 is converted into ECEF Cartesian coordinates. According to an embodiment, the latitude, longitude, and altitude data generated by INS 706 (e.g., the average position of the vehicle) is converted to the ECEF Cartesian coordinate system.

At block 720, a location of the source emitter of the average of the one or more received electromagnetic pulses is determined on the surface of the earth. The determination uses the elevation and azimuth angles in the local body coordinate system from block 716 and the position of the vehicle in the ECEF coordinate system from block 718.

Example MATLAB code is provided below for determining the location of the emission source on the surface of the earth (pointed at by the determined azimuth and elevation angles in the local body coordinate system from a vehicle at a position in the ECEF coordinate system.) In the example code, platpos_ecef provides the ECEF coordinates of the vehicle's position, and the output [x y z] vector is also given in ECEF coordinate nautical miles.

```
% This function finds a location on the surface of the earth that is
% pointed to by the az and el angles from a platform whose ecef coordinates
% are platpos_ecef and whose rotational coordinates are roll/pitch/yaw.
% Input platpos_ecef is a row vector in ecef nm. All angles in degrees.
% Output xyz is in ecef nm.
% Body coordinates are x pos forward, y pos right, z pos down.
% Pos roll cw looking from rear, pos pitch up looking from rear, pos yaw cw
% looking from above.
% Az is positive from nose to the right. El is positive from the water
% line downward.
a=6378137;    % Earth's equatorial radius in meters
b=6356752.314;   % Earth's polar radius in meters
anm=a/1852;   % Equatorial radius (nm)
bnm=b/1852;   % Polar radius (nm)
bx=cosd(el)*cosd(az);
by=cosd(el)*sind(az);
bz=sind(el);
ned=convert_body_to_ned(roll,pitch,yaw,bx,by,bz);
M=[0 1 0;1 0 0;0 0 -1];
enu=M*ned';
%*******************************************************
if roll<0 && az>0 && az<180 && enu(3)>0
    enu(3)=-enu(3);
elseif roll>0 && (az<0 || az>180) && enu(3)>0
    enu(3)=-enu(3);
end
%*******************************************************
lla=convert(platpos_ecef);
unit=convert_vel_enu_to_xyz(enu(1),enu(2),enu(3),lla(2),lla(1));
c2=unit(1)^2+unit(2)^2+(anm^2/bnm^2)*unit(3)^2; % Quadratic term coefficient
c1=2*(unit(1)*platpos_ecef(1)+unit(2)*platpos_ecef(2)+...
    (anm^2/bnm^2)*unit(3)*platpos_ecef(3)); % Linear term coefficient
c0=platpos_ecef(1)^2+platpos_ecef(2)^2+...
    (anm^2/bnm^2)*platpos_ecef(3)^2-anm^2; % Constant term coefficient
% R0=roots([c2 c1 c0]); % Roots
% Alternate computation of the roots using companion matrix directly
C1=c1/c2; C0=c0/c2;
A=[-C1 -C0;1 0]; % Companion matrix
R0=eig(A);   % Roots
idx= min(abs(R0))==abs(R0);
R=R0(idx); %min(R0);
x=platpos_ecef(1)+unit(1)*R;
y=platpos_ecef(2)+unit(2)*R;
z=platpos_ecef(3)+unit(3)*R;
xyz=[x y z];
```

At block 722, a determination is made regarding whether the point on the earth calculated in block 720 is a valid location. For example, if the calculation position on earth is not valid (e.g., the calculated [x y z] position yields an imaginary number), then method 700 proceeds to block 724 where the elevation angle in local body coordinates is modified and then block 720 is executed again with the new elevation angle to calculate a new position on earth. An imaginary position may be calculated if the elevation angle is too small (in which case the vector for determining a location on earth would miss the surface of the earth.). According to an embodiment, the elevation angle may be multiplied by a given factor in block 724, such as, for example, a factor of 1.1. In another embodiment, the elevation angle may be incremented by a given angle amount.

If the calculated position on earth is determined to be a valid result, method 700 continues to block 726 where the calculated earth position is stored in memory for a given dwell time.

At block 728, a total of N earth locations calculated over N different dwell times are averaged together to generate an average earth location. Each of the calculated earth positions from block 720 can be stored in memory at block 726 for later averaging or any other such operations. The total number of dwells (N) used to determine the average earth location can vary, and may be determined on a given situation or application. In some examples, an operator has the ability to choose the value of N. Higher values of N may result in a more accurate determination of the earth location (more data points to average), while a lower value of N may result in a faster determination of the earth location at the expense of higher accuracy.

According to an embodiment, each dwell time may include the same number of received electromagnetic pulses. However, in some embodiments, the number of received electromagnetic pulses are different between different averaged dwell times. In such situations, a weighted average may be applied to account for the different number of received pulses across different dwell times. Accordingly, the average of a given parameter P in a dwell may be determined as:

$$\overline{P} = \Sigma_i(W_i * P_i) \qquad (11)$$

Where $P_i$ is the $i^{th}$ parameter measurement and $W_i$ is the number of pulses in the $i^{th}$ dwell average divided by the total number of pulses in all dwell averages.

At block 730, the calculated average earth location of the source from block 728 is converted from ECEF coordinates into NED coordinates. According to an embodiment, the conversion places the origin of the NED coordinate system at the last averaged position of the vehicle for the last dwell time determined in block 708. The conversion from a point in the ECEF coordinate system to the point in the NED coordinate system can be carried out in standard fashion, as will be apparent in light of this disclosure.

At block 732 the average earth location of the source is converted from NED coordinates into local body coordinates. According to an embodiment, the conversion also uses the average orientation (YPR) of the vehicle for the last dwell time determined in block 708. The conversion from a point in the NED coordinate system to the point in the local body coordinate system can be carried out in standard fashion, as will be apparent in light of this disclosure.

At block 734 a unit vector is formed in the local body coordinate system and pointing towards the location of the source on the earth's surface. The unit vector may be determined by dividing each component [x y z] of the vector to the source position as determined in block 732 by the vector's magnitude.

At block 736, an azimuth and an elevation angle are calculated in the local body coordinate system based on the unit vector from block 734. According to an embodiment, the azimuth and elevation angles determined in block 736 are more accurate than the initial azimuth and elevation angles determined from averaging across pulses received over any one dwell time in block 708. As noted above, the azimuth angle is the AOA.

Based on the calculated azimuth and elevation angles from block 736, the vehicle may be designed to automatically perform one or more functions. For example, the vehicle may automatically steer away from the source of the electromagnetic pulses if the azimuth and elevation angles determined in block 736 meet certain thresholds (e.g., indicate that the vehicle is heading toward the source). In some embodiments, an operator of the vehicle is provided the values of the azimuth and elevation angles computed in block 736. The values may be provided in their raw form on a display, or the display may be used to instead indicate other data derived from the azimuth and elevation angles, such as the total distance to the source. In some embodiments, a graphical map may be displayed to the user indicating the location of the source on the map in reference to the vehicle's current location.

Some modifications to method 700 will be appreciated in light of this disclosure. For example, if no averaging across a plurality of dwells is desired, then the earth position calculated from a single dwell time in block 720 can be passed directly to block 730. In this way, averaging across dwell times in block 728 is not required. Also, in some embodiments, no storage of dwell times in block 726 is performed if no averaging across different dwell times is used.

Example Computing System

Figure 8:
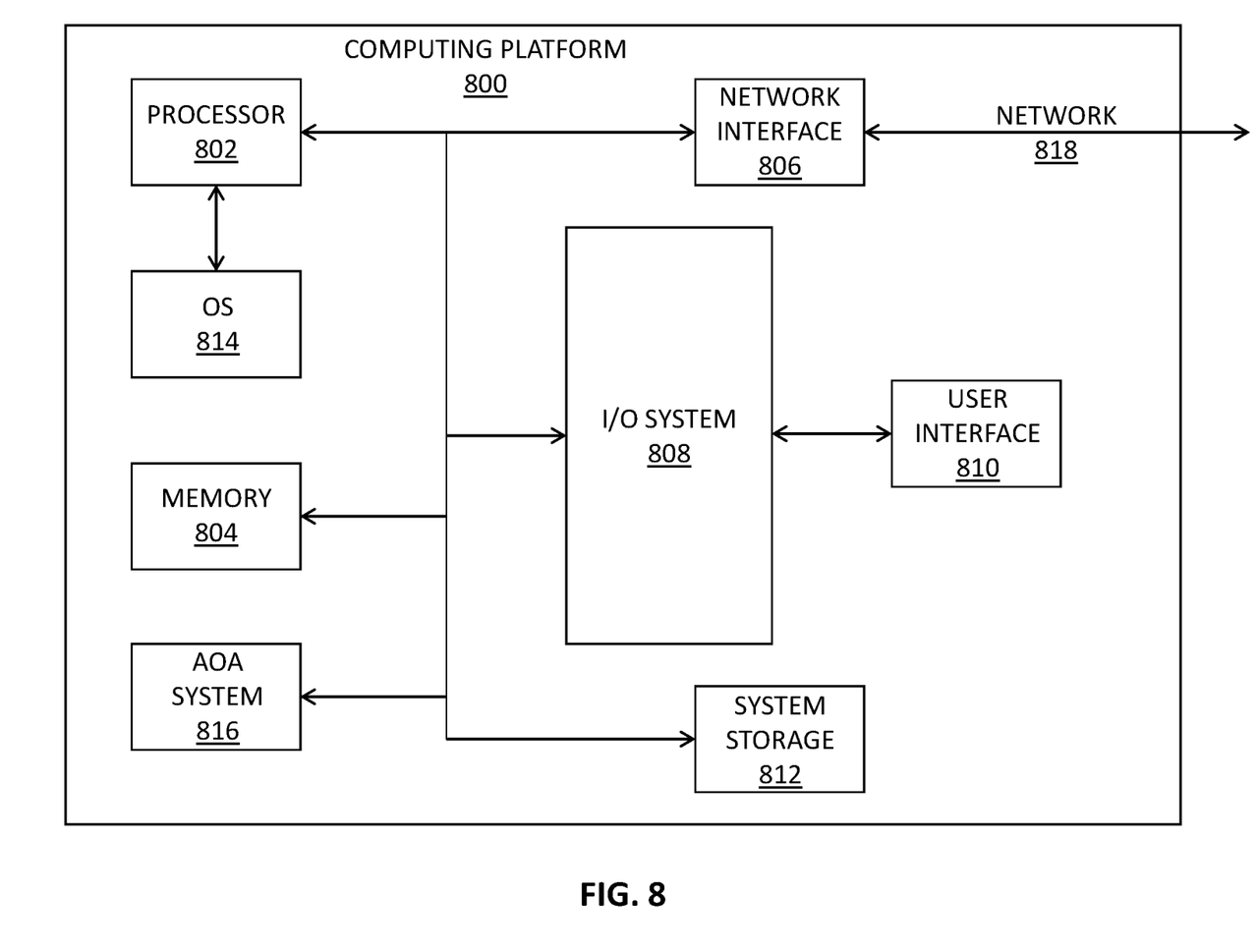
FIG. 8 illustrates an example computer system that can execute software for determining AOA, in accordance with an embodiment of the present disclosure.

FIG. 8 illustrates an example computing platform 800 that interfaces with an AOA system 816 to generate AOA measurements, configured in accordance with certain embodiments of the present disclosure. In some embodiments, computing platform 800 may host, or otherwise be incorporated into a personal computer, workstation, server system, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, imaging device, wearable device, embedded system, and so forth. Any combination of different devices may be used in certain embodiments.

In some embodiments, computing platform 800 may comprise any combination of a processor 802, a memory 804, AOA system 820, a network interface 806, an input/output (I/O) system 808, a user interface 810, and a storage system 812. As can be further seen, a bus and/or interconnect is also provided to allow for communication between the various components listed above and/or other components not shown. Computing platform 800 can be coupled to a network 818 through network interface 806 to allow for communications with other computing devices, platforms, or resources. Other componentry and functionality not reflected in the block diagram of FIG. 8 will be apparent in light of this disclosure, and it will be appreciated that other embodiments are not limited to any particular hardware configuration.

Processor 802 can be any suitable processor and may include one or more coprocessors or controllers to assist in control and processing operations associated with computing system 800. In some embodiments, processor 802 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core.

Memory 804 can be implemented using any suitable type of digital storage including, for example, flash memory and/or random access memory (RAM). In some embodiments, memory 804 may include various layers of memory hierarchy and/or memory caches as are known to those of skill in the art. Memory 804 may be implemented as a volatile memory device such as, but not limited to, a RAM, dynamic RAM (DRAM), or static RAM (SRAM) device. Storage system 812 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage system 812 may comprise technology to increase the storage performance enhanced protection for valuable digital media when multiple hard drives are included.

Processor 802 may be configured to execute an Operating System (OS) 814 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with computing system 800, and therefore may also be implemented using any suitable existing or subsequently-developed platform.

Network interface 806 can be any appropriate network chip or chipset which allows for wired and/or wireless connection between other components of computing platform 800 and/or network 818, thereby enabling computing platform 800 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 808 may be configured to interface between various I/O devices and other components of computing platform 800. I/O devices may include, but not be limited to, a user interface 810. User interface 810 may include devices (not shown) such as a display element, touchpad, keyboard, mouse, and speaker, etc. I/O system 808 may include a graphics subsystem configured to perform processing of images for rendering on a display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 802 or any chipset of computing platform 800. In some embodiments, I/O system 808 also interfaces with the antenna array and INS of AOA system 816.

AOA system 816 represents one or more components configured to determine an AOA for one or more received electromagnetic pulses, according to some of the embodiments discussed herein. AOA system 816 may be substantially the same as AOA determination system 600. Accordingly, AOA system 816 may include its own processor separate from processor 802 for performing one or more of the operations of method 700. In some embodiments, processor 802 performs one or more of the operations of method 700.

It will be appreciated that in some embodiments, the various components of the computing platform 800 may be combined or integrated in a system-on-a-chip (SoC) architecture. In some embodiments, the components may be hardware components, firmware components, software components or any suitable combination of hardware, firmware or software.

In various embodiments, computing platform 800 may be implemented as a wireless system, a wired system, or a combination of both. When implemented as a wireless system, computing platform 800 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, computing platform 800 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Some of the embodiments discussed herein may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

Numerous specific details have been set forth herein to provide a thorough understanding of the embodiments. It will be appreciated, however, that the embodiments may be practiced without these specific details. In other instances, well known operations, components and circuits have not been described in detail so as not to obscure the embodiments. It can be further appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

FURTHER EXAMPLE EMBODIMENTS

The following examples pertain to further embodiments, from which numerous permutations and configurations will be apparent.

Example 1 is a method of determining an angle of arrival (AOA) of electromagnetic pulses received at a vehicle and originating from a source. The method includes determining a position and orientation of the vehicle within a given dwell time; determining an average initial AOA measurement and an average range from the vehicle to the source, wherein the averages are determined based on a plurality of electromagnetic pulses received within the given dwell time; converting the position of the vehicle into an ECEF Cartesian coordinate system; determining an elevation angle between the vehicle and the source based on the position of the vehicle and the average range; converting the elevation angle into a local body coordinate system centered at the vehicle; determining a position of the source using the ECEF Cartesian coordinate system based on the average initial AOA measurement, the converted elevation angle, and the converted position of the vehicle; converting the position of the source into the local body coordinate system centered at the vehicle; generating a vector from the vehicle to the source in the local body coordinate system; and determining the AOA measurement based on the vector.

Example 2 includes the subject matter of Example 1, wherein converting the position of the source into the local body coordinate system comprises: converting the position of the source from the ECEF Cartesian coordinate system into a local level coordinate system; and converting the position of the source from the local level coordinate system to the local body coordinate system.

Example 3 includes the subject matter of Example 1 or 2, wherein determining the position and orientation of the vehicle comprises determining the position and orientation using an inertial navigation system (INS) on board the vehicle.

Example 4 includes the subject matter of any one of Examples 1-3, further comprising increasing the range by a given factor and re-determining the elevation angle between the vehicle and the source if the elevation angle is initially determined to be an imaginary number.

Example 5 includes the subject matter of any one of Examples 1-4, further comprising increasing the elevation angle by a given amount and re-determining the position of the source if the position of the source is initially determined to yield an imaginary result.

Example 6 includes the subject matter of any one of Examples 1-5, wherein determining the position of the source comprises: determining a possible position of the source for each of a plurality of dwell times; and averaging the possible positions of the source across the plurality of dwell times to determine the position of the source.

Example 7 includes the subject matter of Example 6, wherein each of the plurality of dwell times includes an independent number of received electromagnetic pulses.

Example 8 includes the subject matter of any one of Examples 1-7, wherein determining the average initial AOA measurement comprises determining an average initial AOA measurement of the received plurality of electromagnetic pulses using a plurality of antennas on the vehicle.

Example 9 includes the subject matter of any one of Examples 1-8, wherein determining the average range from the vehicle to the source comprises estimating a range from the vehicle to the source based on a power of each of the received electromagnetic pulses.

Example 10 includes the subject matter of any one of Examples 1-9, wherein the vehicle is an aircraft.

Example 11 is a system for use on board a vehicle to determine an angle of arrival (AOA) of received electromagnetic pulses from a source. The system includes an INS configured to determine a position and orientation of the vehicle; a plurality of antennas arranged around the vehicle and configured to receive an electromagnetic pulse; an amplitude detector configured to determine an amplitude of the received electromagnetic pulse from one or more of the plurality of antennas; and a controller. The controller is configured to determine an initial AOA measurement of the received electromagnetic pulse based on the measured amplitude of the received electromagnetic pulse, estimate a range from the vehicle to the source based on a power of the received electromagnetic pulse, determine a position and orientation of the vehicle based on one or more reports received from the INS, average the initial AOA measurement and the range from the vehicle to the source over a plurality of received electromagnetic pulses within a given dwell time to determine an average initial AOA measurement and an average range, convert the position of the vehicle into an ECEF Cartesian coordinate system, determine an elevation angle between the vehicle and the source based on the position of the vehicle and the average range, convert the elevation angle into a local body coordinate system centered at the vehicle, determine a position of the source using the ECEF Cartesian coordinate system based on the average initial AOA measurement, the converted elevation angle, and the converted position of the vehicle, convert the position of the source into the local body coordinate system centered at the vehicle, generate a vector from the vehicle to the source in the local body coordinate system, and determine the AOA measurement based on the vector.

Example 12 includes the subject matter of Example 11, wherein the controller is further configured to estimate the range by comparing the power of the received electromagnetic pulse to a table of transmission power values for a plurality of radar systems.

Example 13 includes the subject matter of Example 11 or 12, further comprising a global positioning system (GPS) configured to determine the position of the vehicle.

Example 14 includes the subject matter of any one of Examples 11-13, wherein the controller is configured to convert the position of the source into the local body coordinate system by: converting the position of the source from the ECEF Cartesian coordinate system into a local level coordinate system; and converting the position of the source from the local level coordinate system to the local body coordinate system.

Example 15 includes the subject matter of any one of Examples 11-14, wherein the controller is further configured to increase the range by a given factor and re-determine the elevation angle between the vehicle and the source if the elevation angle is initially determined to be an imaginary number.

Example 16 includes the subject matter of any one of Examples 11-15, wherein the controller is further configured to increase the elevation angle by a given amount and re-determine the position of the source if the position of the source is initially determined to yield an imaginary result.

Example 17 includes the subject matter of any one of Examples 11-16, wherein the controller is further configured to: determine the position of the source by determining a possible position of the source for each of a plurality of dwell times; and average the possible positions of the source across the plurality of dwell times.

Example 18 includes the subject matter of any one of Example 17, wherein each of the plurality of dwell times includes an independent number of received electromagnetic pulses.

Example 19 includes the subject matter of any one of Examples 11-18, wherein the vehicle is an aircraft.

Example 20 is a computer program product including one or more non-transitory machine-readable mediums having instructions encoded thereon that, when executed by one or more processors, result in a plurality of operations for determining an angle of arrival (AOA) of electromagnetic pulses received at a vehicle and originating from a source. The operations include determining a position and orientation of the vehicle within a given dwell time; determining an average initial AOA measurement and an average range from the vehicle to the source, wherein the averages are determined based on a plurality of electromagnetic pulses received within the given dwell time; converting the position of the vehicle into an ECEF Cartesian coordinate system; determining an elevation angle between the vehicle and the source based on the position of the vehicle and the average range; converting the elevation angle into a local body coordinate system centered at the vehicle; determining a position of the source using the ECEF Cartesian coordinate system based on the average initial AOA measurement, the converted elevation angle, and the converted position of the vehicle; converting the position of the source into the local body coordinate system centered at the vehicle; generating a vector from the vehicle to the source in the local body coordinate system; and determining the AOA measurement based on the vector.

Example 21 includes the subject matter of Example 20, wherein converting the position of the source into the local body coordinate system comprises: converting the position of the source from the ECEF Cartesian coordinate system into a local level coordinate system; and converting the position of the source from the local level coordinate system to the local body coordinate system.

Example 22 includes the subject matter of Example 20 or 21, wherein determining the position and orientation of the vehicle comprises determining the position and orientation using an inertial navigation system (INS) on board the vehicle.

Example 23 includes the subject matter of any one of Examples 20-22, wherein the operations further comprise increasing the range by a given factor and re-determining the elevation angle between the vehicle and the source if the elevation angle is initially determined to be an imaginary number.

Example 24 includes the subject matter of any one of Examples 20-23, wherein the operations further comprise increasing the elevation angle by a given amount and re-determining the position of the source if the position of the source is initially determined to yield an imaginary result.

Example 25 includes the subject matter of any one of Examples 20-24, wherein determining the position of the source comprises: determining a possible position of the source for each of a plurality of dwell times; and averaging the possible positions of the source across the plurality of dwell times to determine the position of the source.

Example 26 includes the subject matter of Example 25, wherein each of the plurality of dwell times includes an independent number of received electromagnetic pulses.

Example 27 includes the subject matter of any one of Examples 20-26, wherein the vehicle is an aircraft.

What is claimed is:

1. A method of determining an angle of arrival (AOA) of electromagnetic pulses received at a vehicle and originating from a source, the method comprising:
    determining a position and orientation of the vehicle within a given dwell time;
    determining an average initial AOA measurement and an average range from the vehicle to the source, wherein the averages are determined based on a plurality of electromagnetic pulses received within the given dwell time;
    converting the position of the vehicle into an ECEF Cartesian coordinate system;
    determining an elevation angle in the NED coordinate system between the vehicle and the source based on the position of the vehicle and the average range;
    converting the elevation angle from the NED coordinate system into a local body coordinate system centered at the vehicle;
    determining a position of the source using the ECEF Cartesian coordinate system based on the average initial AOA measurement in the local body coordinate system, the converted elevation angle in the local body coordinate system, and the converted position of the vehicle in the ECEF Cartesian coordinate system;
    converting the position of the source into the local body coordinate system centered at the vehicle;
    generating a direction vector from the vehicle to the source in the local body coordinate system; and
    determining the AOA measurement based on the direction vector,
    wherein determining the position of the source comprises:
        determining a possible position of the source for each of a plurality of dwell times; and
        averaging the possible positions of the source across the plurality of dwell times to determine the position of the source,
        wherein each of the plurality of dwell times includes an independent number of received electromagnetic pulses.

2. The method of claim 1, wherein converting the position of the source into the local body coordinate system comprises:

converting the position of the source from the ECEF Cartesian coordinate system into a local level coordinate system; and converting the position of the source from the local level coordinate system to the local body coordinate system.

3. The method of claim 1, wherein determining the position and orientation of the vehicle comprises determining the position and orientation using an inertial navigation system (INS) on board the vehicle.

4. The method of claim 1, further comprising increasing the range by a given factor and re-determining the elevation angle between the vehicle and the source if the elevation angle is initially determined to be an imaginary number.

5. The method of claim 1, further comprising increasing the elevation angle by a given amount and re-determining the position of the source if the position of the source is initially determined to yield an imaginary result.

6. The method of claim 1, wherein determining the average initial AOA measurement comprises determining an average initial AOA measurement of the received plurality of electromagnetic pulses using a plurality of antennas on the vehicle, and wherein determining the average range from the vehicle to the source comprises estimating a range from the vehicle to the source based on a power of each of the received electromagnetic pulses.

7. A system for use on board a vehicle to determine an angle of arrival (AOA) of received electromagnetic pulses from a source, the system comprising:
  an INS configured to determine a position and orientation of the vehicle;
  a plurality of antennas arranged around the vehicle and configured to receive an electromagnetic pulse;
  an amplitude detector configured to determine an amplitude of the received electromagnetic pulse from one or more of the plurality of antennas; and
  a controller configured to
    determine an initial AOA measurement of the received electromagnetic pulse based on the measured amplitude of the received electromagnetic pulse,
    estimate a range from the vehicle to the source based on a power of the received electromagnetic pulse,
    determine a position and orientation of the vehicle based on one or more reports received from the INS,
    average the initial AOA measurement and the range from the vehicle to the source over a plurality of received electromagnetic pulses within a given dwell time to determine an average initial AOA measurement and an average range,
    convert the position of the vehicle into an ECEF Cartesian coordinate system,
    determine an elevation angle between the vehicle and the source based on the position of the vehicle and the average range,
    convert the elevation angle into a local body coordinate system centered at the vehicle,
    determine a position of the source using the ECEF Cartesian coordinate system based on the average initial AOA measurement, the converted elevation angle, and the converted position of the vehicle,
    convert the position of the source into the local body coordinate system centered at the vehicle,
    generate a vector from the vehicle to the source in the local body coordinate system,
    estimating a location of the source over a plurality of dwells and averaging to find a centroid location;
    calculating a centroid direction vector to the centroid location;
    and
    determine the AOA measurement based on the centroid direction vector.

8. The system of claim 7, wherein the controller is further configured to estimate the range by comparing the power of the received electromagnetic pulse to a table of transmission power values for a plurality of radar systems.

9. The system of claim 7, further comprising a global positioning system (GPS) configured to determine the position of the vehicle.

10. The system of claim 7, wherein the controller is configured to convert the position of the source into the local body coordinate system by:
  converting the position of the source from the ECEF Cartesian coordinate system into a local level coordinate system; and
  converting the position of the source from the local level coordinate system to the local body coordinate system.

11. The system of claim 7, wherein the controller is further configured to increase the range by a given factor and re-determine the elevation angle between the vehicle and the source if the elevation angle is initially determined to be an imaginary number.

12. The system of claim 7, wherein the controller is further configured to increase the elevation angle by a given amount and re-determine the position of the source if the position of the source is initially determined to yield an imaginary result.

13. A computer program product including one or more non-transitory machine-readable mediums having instructions encoded thereon that, when executed by one or more processors, result in a plurality of operations for determining an angle of arrival (AOA) of electromagnetic pulses received at a vehicle and originating from a source, the operations comprising:
  determining a position and orientation of the vehicle within a given dwell time;
  determining an average initial AOA measurement and an average range from the vehicle to the source, wherein the averages are determined based on a plurality of electromagnetic pulses received within the given dwell time;
  converting the average position of the vehicle into an ECEF Cartesian coordinate system;
  determining an elevation angle between the vehicle and the source based on the position of the vehicle and the average range;
  converting the elevation angle into a local body coordinate system centered at the vehicle;
  determining a position of the source using the ECEF Cartesian coordinate system based on the average initial AOA measurement, the converted elevation angle, and the converted position of the vehicle;
  converting the position of the source into the local body coordinate system centered at the vehicle;
  generating a vector from the vehicle to the source in the local body coordinate system; and
  determining the AOA measurement based on the vector,
  wherein determining the position of the source comprises:
    determining a possible position of the source for each of a plurality of dwell times; and
    averaging the possible positions of the source across the plurality of dwell times to determine the position of the source,
    wherein each of the plurality of dwell times includes an independent number of received electromagnetic pulses.

14. The computer program product of claim 13, wherein converting the position of the source into the local body coordinate system comprises:
    converting the position of the source from the ECEF Cartesian coordinate system into a local level coordinate system; and
    converting the position of the source from the local level coordinate system to the local body coordinate system.

15. The computer program product of claim 13, wherein determining the position and orientation of the vehicle comprises determining the position and orientation using an inertial navigation system (INS) on board the vehicle.

16. The computer program product of claim 13, wherein the operations further comprise increasing the range by a given factor and re-determining the elevation angle between the vehicle and the source if the elevation angle is initially determined to be an imaginary number.

17. The computer program product of claim 13, wherein the operations further comprise increasing the elevation angle by a given amount and re-determining the position of the source if the position of the source is initially determined to yield an imaginary result.

\* \* \* \* \*